J. TAMBOUR.
AUTOMATIC SAFETY DEVICE FOR THE STRIKERS OR FIRING BOLTS OF SMALL ARMS.
APPLICATION FILED DEC. 20, 1905.
938,349.
Patented Oct. 26, 1909.
4 SHEETS—SHEET 1.
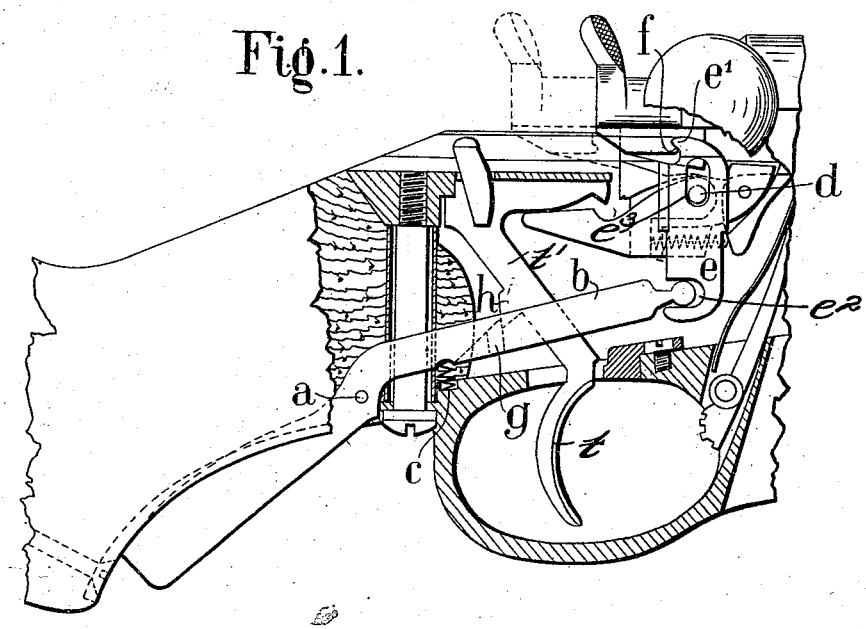
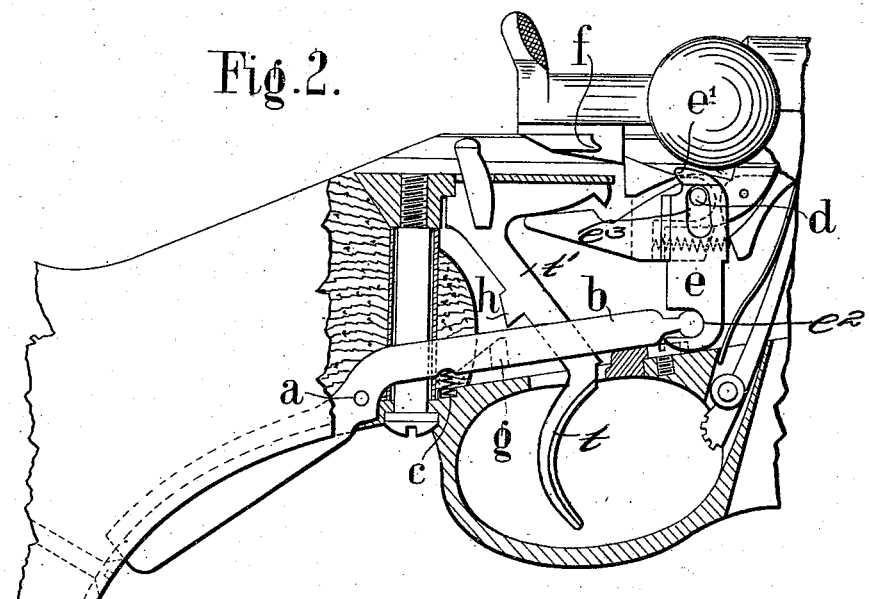
Witnesses:
Inventor
Joseph Tambour J. TAMBOUR.
AUTOMATIC SAFETY DEVICE FOR THE STRIKERS OR FIRING BOLTS OF SMALL ARMS.
APPLICATION FILED DEC. 20, 1905.

938,349.

Patented Oct. 26, 1909.

4 SHEETS—SHEET 2.

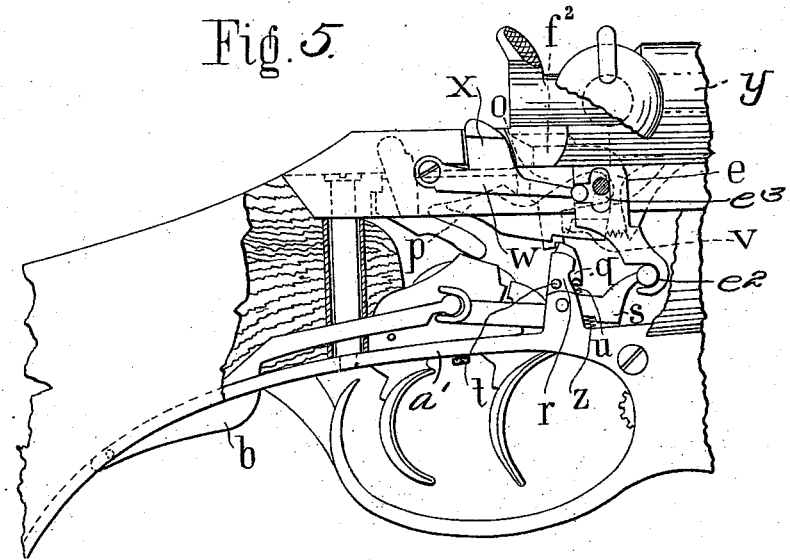
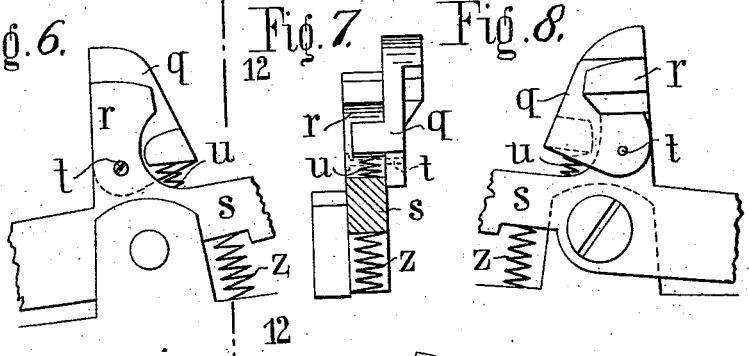

J. TAMBOUR.
AUTOMATIC SAFETY DEVICE FOR THE STRIKERS OR FIRING BOLTS OF SMALL ARMS.
APPLICATION FILED DEC. 20, 1905.
938,349.
Patented Oct. 26, 1909.
4 SHEETS—SHEET 4.
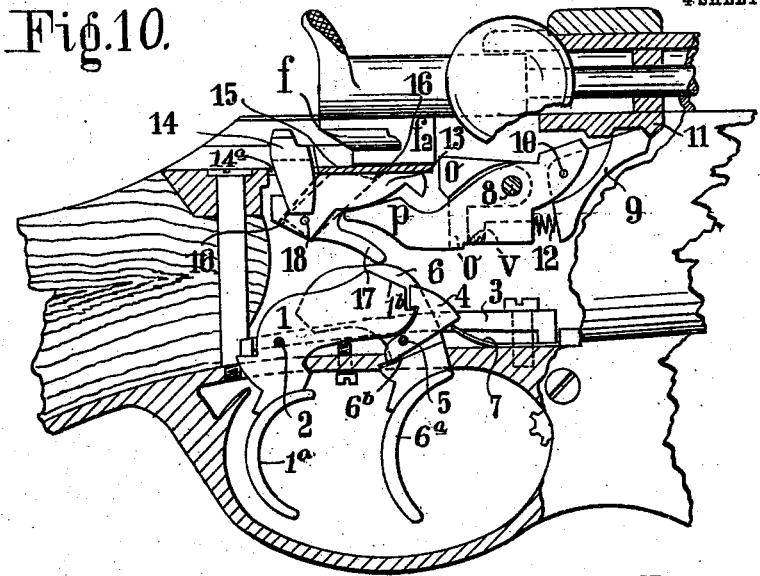
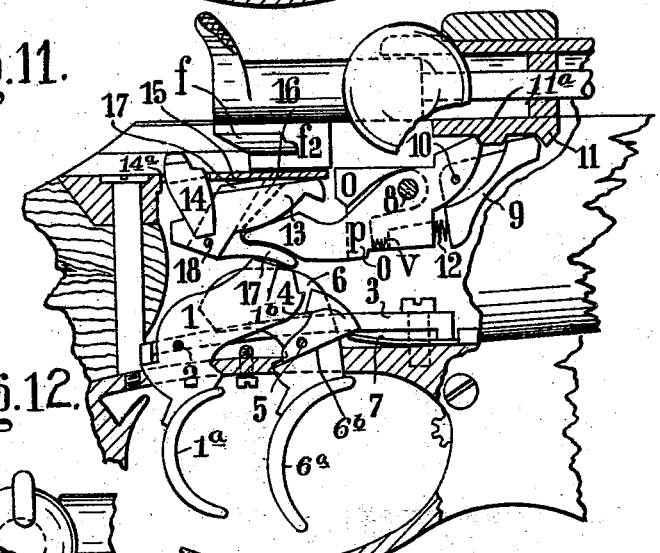
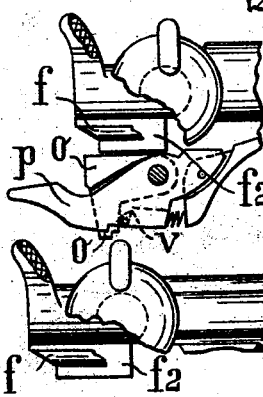
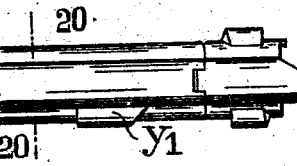
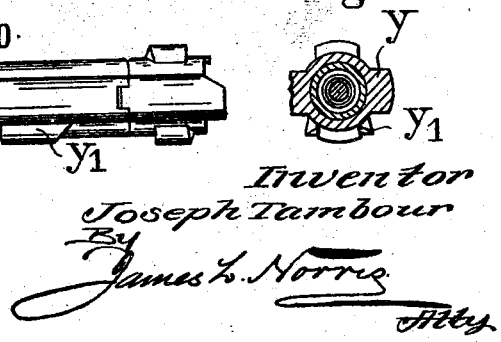
Witnesses:
Inventor
Joseph Tambour
By
James L. Norris
Atty

UNITED STATES PATENT OFFICE.

JOSEPH TAMBOUR, OF NANTERRE, NEAR PARIS, FRANCE.

AUTOMATIC SAFETY DEVICE FOR THE STRIKERS OR FIRING-BOLTS OF SMALL-ARMS.

938,349.  Specification of Letters Patent.  Patented Oct. 26, 1909.

Application filed December 20, 1905. Serial No. 292,625.

*To all whom it may concern:*

Be it known that I, JOSEPH TAMBOUR, subject of the Emperor of Austria-Hungary, residing at Nanterre, near Paris, France, have invented certain new and useful Improvements in Automatic Safety Devices for the Strikers or Firing-Bolts of Small-Arms, of which the following is a specification.

This invention relates to automatic safety mechanism for the striker or firing bolt of small arms in which a vertically movable locking bolt, actuated through the medium of a compulsory motion by a well known form of releasing lever when the striker is manually relaxed or the mechanism slightly cocked, comes into engagement with a nose on the striker piece and which serves the purpose of a catching notch, and thereby simultaneously locks the releasing lever and the trigger so that in this position both the striker and the trigger are safety bolted.

This improved safety mechanism for strikers can be applied to or employed with all small firearms having movable breech blocks and in which the part carrying the sear does not constitute one piece with the sear or so that the latter is independently movable.

In the accompanying drawings two forms of small arms are shown as provided with the safety device for strikers or firing bolts in accordance with the features of the invention.

Figure 3:
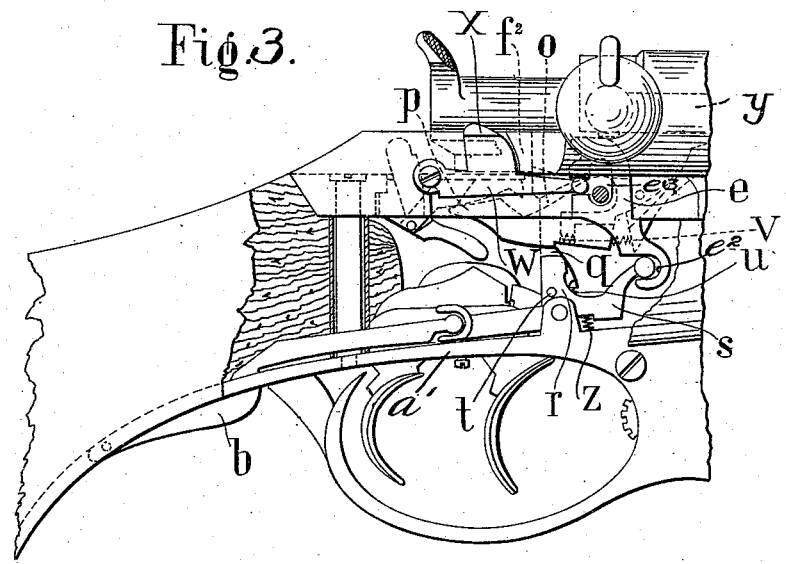
Figure 4:
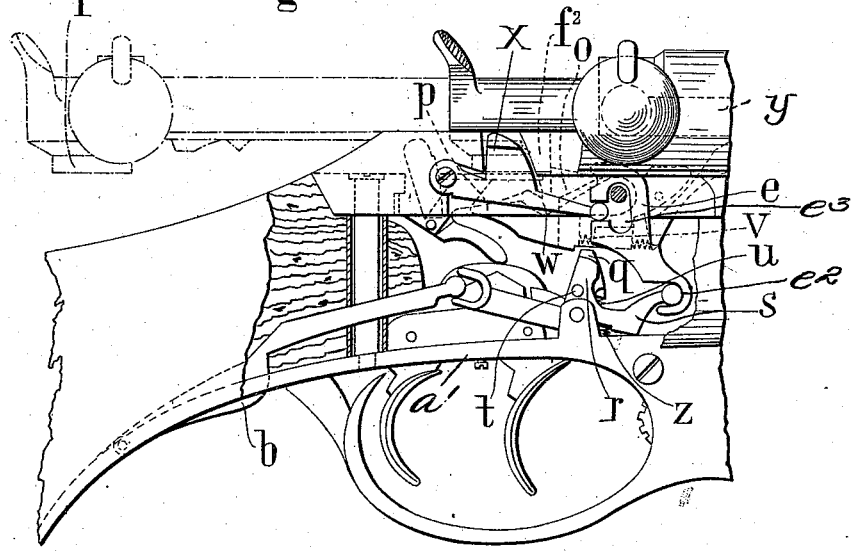

In the drawings:—Figure 1 is a sectional elevation of a portion of a Mannlicher repeating rifle constructed in accordance with the features of the invention and showing the striker relaxed and brought into engagement with the nose or catching notch of the striker piece. Fig. 2 is a similar view showing the parts in position for firing. Fig. 3 is a similar view illustrating the application of the invention to a repeating gun with a hair trigger and in which the sear is independently movable, the trigger or trigger device being safety bolted. Fig. 4 is a view similar to Fig. 3 of the same mechanism, illustrating the trigger or trigger device released. Fig. 5 is a similar view of the mechanism shown by Fig. 4 and illustrating the position of the parts after firing. Fig. 6 is a detail elevation showing a supporting piece, embodied in the mechanism illustrated by Figs. 3, 4 and 5, having spring action which holds the sear in safety position and also a lever carrying said piece. Fig. 7 is a cross-section on the line 12—12, Fig. 6. Fig. 8 illustrates the mechanism shown by Fig. 6 from the opposite side. Fig. 9 is a view of the devices shown by Figs. 6, 7 and 8 and illustrating the striker released. Fig. 10 is a sectional elevation showing a different arrangement of the trigger mechanism and illustrating the trigger tongue inserted in the said mechanism. Fig. 11 is a view similar to Fig. 10 of the same mechanism and illustrating the position of the parts of the latter at the moment the sear is moved down by means of the striker and trigger tongue and before the striker moves forwardly. Fig. 12 illustrates a part of the mechanism as shown by Figs. 10 and 11. Fig. 13 is a side elevation of the form of breech block used with the rifle mechanism illustrated by Figs. 10 and 11. Fig. 14 is a cross-section on the line 20—20, Fig. 13.

In the construction shown by Figs. 1 and 2, the releasing lever $b$ has its front arm subjected to the pressure of a spring $c$ engaging the lower edge thereof and is pivoted at $a$ so that its pressure piece passing through the trigger guard plate $a'$ is located under the reduced extremity of the butt. The front end of the releasing lever terminates in a rounded head which is engaged in a notch $e^2$ of a locking bolt $e$ having at its upper part a slot $e^3$ which is guided by a pin $d$; above the slot the bolt $e$ is reduced in wedge shape, the side toward the barrel being rounded, while the rear side is made hook-shaped at $e'$. At the right hand side of the striker head is provided, according to the present invention, a nose $f$. The releasing lever $b$ is provided with a lateral projection $g$ which, in the position of rest of the lever, is situated behind a projection $h$ of the trigger bar $t'$ continuing from the trigger $t$, as shown in Fig. 1.

The action of the safety device is as follows: By means of the spring $c$ the front end of the releasing lever $b$ is normally held in a raised position whereby the projection $h$ of the trigger bar is made to abut against the projection $g$ of the releasing lever $b$ so that the trigger is locked and the locking bolt $e$ has its upper end projected into the path of the striker head. The striker head is of rounded form and has an incline, and on opening the breech block slides with its rear lower surface over the upper end of the locking bolt and depresses the said lever $b$ against the resistance of the spring $c$. Immediately subsequent to this operation the locking bolt $e$ is automatically forced upwardly into the path of the striker head and the nose $f$ engages the locking bolt as soon as the latter is relaxed or retreats far enough to permit such engagement, and this automatic action will ensue if the mechanism is manually cocked or the breech block moved by hand. This locked position, shown by Fig. 1, not only effectually safety bolts the striker in the safety position, but also locks the releasing lever which coöperates with the locking bolt. The releasing lever is thus rendered perfectly rigid and consequently also effectually locks the trigger and firing mechanism so that an accidental firing of the gun in this position of the parts cannot occur by pressure on the trigger or from any cause. To dispose the parts for firing, as shown by Fig. 2, the striker can be fully cocked by manually drawing back the striker head or the breech block. In the event that the striker is released during such drawing back, or of its being jerked out of engagement with the cocking notch, it is prevented from being completely thrown forward by the locking bolt. If the gun is grasped at the reduced portion of the butt when the striker is cocked, the exposed rear end of the lever $b$ is thereby pressed into the said portion of the butt and release of the lock mechanism is effected, because the locking bolt will be drawn down out of the path of the striker head and the trigger bar set free, which latter action, in consequence of the peculiar arrangement of the projections on the trigger bar and releasing lever, is only effective when the locking bolt is drawn completely out of the path of the striker.

In small arms with movable breech blocks and in which the part carrying the sear is not rigidly fixed to the latter, the sear is directly held in the locked position, not by a rigid lever arm, but by a supporting piece movably arranged thereon and having spring action, see Figs. 3 to 9, both inclusive. In this arrangement, without provision of suitable means, a repeating action would be prevented by the locking bolt which is maintained in a raised position, and the said bolt in the normal position of the releasing lever with the intermediate lever, constitutes a rigid obstruction, and consequently prevents the forward motion of the breech block which is withdrawn on repeating, as the right hand side guiding rib $y'$ of the breech block, see Figs. 13 and 14, showing a substantially similar construction of breech block, would strike against the upper end of the locking bolt. To permit repeating action to be effected in this form of the mechanism, there is provided an upwardly projecting setting lever W pivotally mounted on the breech casing to engage with the locking bolt and projecting into the path of the right hand side rib $y$ of the breech block, which lever is pressed downwardly on the forward motion of the breech block and causes the locking bolt to lower, the said locking bolt remaining in lowered position so long as the lever is acted upon by the rib.

Figs. 3 to 5 show a firearm with a rectilinear breech block motion and with hair trigger lock, having the above described safety bolting device for the striker. The sear lever $p$ carrying the sear $o$ is not rigidly fixed to the latter, so that for the required safety bolting action the abutment of the sear lever would not be sufficient; on this account the sear $o$ itself is locked by means of a supporting piece $q$, Fig. 9, which is pivotally mounted on the pin $t$ of the arm $r$ of the elbow lever $s$, which is pivotally mounted on the trigger guard plate, the piece $q$ being acted upon by a spring $u$. On pressing inward the releasing lever $b$, the lever $s$, together with the supporting piece $q$, is turned so as to free the sear $o$ as shown at Fig. 4. When the striker has been thrown forward the cocking notch $f^2$, which is formed as a rib preferably of the shape shown and having a horizontal lower surface, presses the sear $o$ below the under surface of the sear lever $p$ so that the supporting piece $q$ on the movement of the elbow lever $s$ into the safety position, cannot move with the latter but bears against the projecting part of the sear $o$, compressing the spring $u$ and remaining in this position, Fig. 5, until the striker is again cocked, and the sear, in consequence thereof, is raised under the action of its spring $v$ shown in dotted lines; whereupon the supporting piece $q$ is moved by its spring $u$ from the position shown at Fig. 5 into the position shown at Fig. 3, placing itself directly under the sear $o$.

The locking bolt $e$, upon which acts the releasing lever $b$ through the medium of the elbow lever $s$ subject to the pressure of the spring $z$, constitutes with the releasing lever, when in the protruded position, a rigid obstruction and is then situated in the raised position so that the upper end of the locking bolt prevents the shifting of the breech block for the purpose of repeating, inasmuch as on pushing forward the withdrawn breech block its right-hand side guiding rib $y'$, Figs. 13 and 14, would strike against the locking bolt and thereby prevent the closing of the breech block. In order to obviate this hindrance of the repeating action there is pivotally mounted on the side of the breech casing a setting lever W, which engages with the locking bolt $e$ and projects with a nose $x$ into the path of the right-hand side rib $y$ of the breech block, Figs. 13 and 14. On drawing back the breech block the right-hand side guiding rib y' thereof, into whose path the locking bolt e projects, passes over the latter and depresses it, as shown in dotted lines at Fig. 4. As the locking bolt e, the intermediate lever s, and the releasing lever b are connected, the spring z, which would be compressed by such motion, would at once raise these parts again into their original position so as to raise the locking bolt immediately after the guiding rib of the breech block has passed over the latter. This is, however, prevented by the right-hand rib y of the withdrawn breech block which passes over the beak X of the setting lever W, so that the locking bolt e is forcibly lowered. The guiding rib y' of the breech block can, therefore, pass back unhindered, as by the lowering of the locking bolt this has been moved out of the path of the right-hand side guiding rib y' and the breech block can be entirely withdrawn for the purpose of raising a cartridge out of the magazine and can then be pushed forward again for introducing the raised cartridge into the chamber of the gun. During such forward motion of the breech block the locking bolt remains lowered until the beak X of the setting lever has been freed by the passing away of the rib y, which only occurs when the guiding rib y' of the breech block has already passed away from above the locking bolt. By this means, consequently, the repeating action can take place unhindered owing to the action of the setting lever W.

In the construction shown by Figs. 10, 11 and 12, the trigger mechanism is arranged as follows: The trigger blade 1 of the rear trigger 1ª is movably held by a pin or bolt 2 and remains under the pressure of a spring 3 engaging the rear portion thereof, as clearly shown by Figs. 10 and 11, the said trigger blade interlocking in the trigger catch piece 4 as soon as the said trigger blade 1 is disposed in proper position by drawing backwardly on the said trigger 1ª, see Fig. 10. The trigger catch piece 4 is pivotally mounted and revoluble on a pin 5 of the trigger tongue blade 6 of the forward trigger 6ª, and said catch piece is engaged by a spring 7, and also supported on the trigger tongue blade 6 in such position that its lower end will be adjacent to the striking surface or shoulder 6ᵇ of the trigger tongue blade 6. The sear o is revolubly mounted on the pivot 8 and works in a seat in the sear lever p, as shown by dotted lines, and is held in proper position with respect to the said lever by means of a spring v. The sear lever p is also pivotally mounted on the sear pivot 8, and to the front extremity thereof an oscillator 9 is movably attached by a pin 10 engaging the front end of the sear lever, the said oscillator 9 being held up in engagement with an oscillator projection or support 11 on the under side of the breech block, a spring 12 being interposed between the oscillator and the sear lever p. The spring 12 not only operates to hold the oscillator 9 upwardly as shown to engage the support 11 on the under side of the breech block, but also forces the rear extremity of the sear lever p under and in engagement with a stop lever 13, the rear extremity of the sear lever being wedge-shaped. The stop lever 13 with two limiting sears 14 freely projects through an opening 14ª in the breech casing, and said stop lever 13 is held by the sear lever p against the bottom wall 15 of the breech casing. The stop lever 13 has a seat 16 therein, as shown by dotted lines, and in this seat a bell-crank lever 17 is movably arranged and held by a pivot 18, one of the arms of the bell-crank lever being directed upwardly. The smaller and lighter arm of the bell-crank lever is in the position shown by Fig. 10, being held in such position by the weight of the remaining portion of the lever, and this arm has an oblique or inclined front edge which bears on the front wall of the seat 16, and its upper edge has an obtuse angular slope and coöperates or contacts with the bottom wall 15 of the breech casing.

When the trigger 6ª is drawn backwardly, as shown by Fig. 11, the trigger blade 1 is thrown out of engagement with the catch piece 4 and the latter will engage the striking surface of shoulder 6ᵇ of the blade 6. When the trigger blade 1 is released it will be forced upwardly by the action of the spring 3 thereon and the upper inclined or oblique surface thereof, as at 1ᵇ, will be pressed against the under arm of the crank lever 17. When the trigger 6ª and its blade 6 are in the position shown in Fig. 10, the said blade 6 will engage the lower arm of the crank lever The trigger blade 1, by engaging the lower arm of the lever 17, forces said lever around on its pivot 18 until the upper edge or the upper arm of said crank lever strikes against the bottom wall 15 of the breech casing, and this operation causes the stop lever 13 to be turned and set up an engagement with the rear wedge-shaped extremity of the sear lever p. This engagement of the sear lever p by the stop lever 13 depresses the resistance of the spring said lever against the forward projection of the 12 and forces the sear lever upwardly, as shown by Fig. 11, into engagement with a shouldered projection 11ª of the breech block, and by this means the striking bolt is liberated or the arm disposed in condition for firing.

What is claimed is:

1. In an automatic safety device for small firearms of the class specified, a movable breech block having a striker device with a nose, a locking bolt having a rectilinear up and down motion and engaging the nose of the striker device when the latter is moved, the nose serving as a catching notch for the locking bolt, a releasing lever operatively associated with and actuating the locking bolt, and a trigger also operatively associated with the said lever and held fixed at intervals, the trigger being liberated by the actuation of the releasing lever.

2. In an automatic safety device for small firearms of the class specified, a movable breech block having a striker device, a locking bolt having a rounded portion and a slantingly cut off portion, the locking bolt being also provided with a recess in its lower portion, an elbow lever having a front end which engages the said recess, a trigger guard plate to which the said lever is pivoted, and a releasing lever operatively associated with the elbow lever for actuating the latter.

3. In an automatic safety device for small firearms of the class specified, a movable breech block having a striker device, a locking bolt, an elbow lever operatively associated with the locking bolt and having an arm, a supporting piece movably arranged on the arm of the elbow lever and under spring stress, a sear held and maintained in its safety position by the supporting piece, a sear lever, and a releasing lever which when pressed inwardly actuates the supporting piece and elbow lever and releases the sear.

4. In an automatic safety device of the class specified, a movable breech block having a striker device and provided with ribs at opposite portions, a locking bolt operatively associated with the striker, and a setting lever combined with a releasing lever, the setting lever being operable to project into the path of the rib at one side of the breech block and pressed downwardly whenever the breech block is displaced so that the said setting lever moves the locking bolt downwardly and maintains the same pulled back out of the path of the guiding rib at the other side of the breech block.

In testimony whereof I have hereunto set my hand in presence of two subscribing witnesses.

JOSEPH TAMBOUR.

Witnesses:
  JOSEF RUBARCK,
  ALVESTO S. HOGUE.